(12) United States Patent
Liu et al.

(10) Patent No.: US 11,374,719 B2
(45) Date of Patent: Jun. 28, 2022

(54) METHOD FOR DATA DETECTION, AND USER EQUIPMENT

(71) Applicant: NTT DOCOMO, INC., Tokyo (JP)

(72) Inventors: Jiahui Liu, Beijing (CN); Qin Mu, Beijing (CN); Liu Liu, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 158 days.

(21) Appl. No.: 16/609,577

(22) PCT Filed: Apr. 24, 2018

(86) PCT No.: PCT/CN2018/084198
§ 371 (c)(1),
(2) Date: Oct. 30, 2019

(87) PCT Pub. No.: WO2018/201928
PCT Pub. Date: Nov. 8, 2018

(65) Prior Publication Data
US 2020/0067679 A1 Feb. 27, 2020

(30) Foreign Application Priority Data

May 4, 2017 (CN) .......................... 201710309134.5

(51) Int. Cl.
*H04L 5/00* (2006.01)
*H04W 24/08* (2009.01)
(Continued)

(52) U.S. Cl.
CPC ............ *H04L 5/0055* (2013.01); *H04L 5/001* (2013.01); *H04L 5/0048* (2013.01); *H04W 24/08* (2013.01);
(Continued)

(58) Field of Classification Search
CPC . H04W 72/06; H04W 72/0413; H04W 24/08; H04W 72/042; H04W 72/10;
(Continued)

(56) References Cited

U.S. PATENT DOCUMENTS

2009/0245284 A1 10/2009 Xu et al.
2021/0029592 A1* 1/2021 Gupta ............... H04W 36/0022

FOREIGN PATENT DOCUMENTS

CN 1902831 A 1/2007
CN 101534562 A 9/2009
(Continued)

OTHER PUBLICATIONS

International Search Report (ISR) of the international application PCT/CN2018/084198, dated Jun. 21, 2018.
(Continued)

*Primary Examiner* — Anez C Ebrahim
(74) *Attorney, Agent, or Firm* — Osha Bergman Watanabe & Burton LLP

(57) ABSTRACT

The present invention relates to a method for realizing data detection for a physical downlink channel in an Internet of Things, and a user equipment unit. The method for data detection includes: monitoring a first communication channel and a second communication channel; and after start of a period during which the second communication channel is monitored, if monitoring periods of the first communication channel and the second communication channel overlap, performing data detection according to priority levels of the channels, wherein the second communication channel is used to transmit information to a group of user equipment units in one transmission, and the information is acknowledge information transmitted by a base station for acknowledgement of reception of uplink data.

10 Claims, 9 Drawing Sheets

(51) Int. Cl.
  *H04W 72/04* (2009.01)
  *H04W 72/06* (2009.01)
  *H04W 72/10* (2009.01)
(52) U.S. Cl.
  CPC ..... *H04W 72/042* (2013.01); *H04W 72/0413* (2013.01); *H04W 72/06* (2013.01); *H04W 72/10* (2013.01)
(58) Field of Classification Search
  CPC ... H04L 5/0055; H04L 5/001; H04L 47/2433; H04L 5/0048; H04L 1/1829
  See application file for complete search history.

(56) References Cited

FOREIGN PATENT DOCUMENTS

| | | |
|---|---|---|
| CN | 101742651 A | 6/2010 |
| CN | 102215581 A | 10/2011 |
| CN | 102378254 A | 3/2012 |
| CN | 102752085 A | 10/2012 |
| CN | 104641577 A | 5/2015 |
| CN | 104854940 A | 8/2015 |
| CN | 105991245 A | 10/2016 |

OTHER PUBLICATIONS

International Preliminary Report on Patentability issued in PCT/CN2018/084198, dated Nov. 5, 2019.

* cited by examiner

METHOD FOR DATA DETECTION, AND USER EQUIPMENT

CROSS-REFERENCE TO RELATED APPLICATIONS

This application is a 371 U.S. National Stage of International Application No. PCT/CN2018/084198, filed on Apr. 24, 2018, which claims priority to Chinese Application No. 201710309134.5, filed on May 4, 2017. The entire disclosures of the above applications are incorporated herein by reference.

TECHNICAL FIELD

The present disclosure relates to a field of mobile communications, and in particular to a method for realizing data detection for a physical downlink channel in an Internet of Things, and a user equipment thereof.

BACKGROUND

With developments of a mobile communication industry and ever-growing demands for mobile data services, people have higher and higher requirements on speed and quality of service (Qos) of mobile communications. Currently, the 5th generation mobile communication technology (5G) standards for network diversification, broadband, integration, and intelligence are being developed and applied.

In addition to a broadband rate and quality, the 5G network has a most prominent feature of considering an application of the Internet of Things from needs and stages involved. Development of the Internet of Things will play an extremely important role in 5G so that respective devices with data acquisition and communication capabilities are connected with each other through the network, to perform various types of control, detection, identification and service, and provide mankind with more convenient, comfortable and safe living.

In order to implement an early acknowledgement for reception of uplink data in an application scenario of the Internet of Things, an early acknowledgement scheme is proposed, in which the user equipment confirms the reception of uplink data by a base station by detecting an acknowledgement feedback (ACK) from the base station. The above-described ACK information on reception of the uplink data may be transmitted through a group-based Physical Downlink Control Channel (G-MPDCCH) under the Internet of Things, and the ACK information is transmitted to a group of user equipments in one transmission.

When the G-MPDCCH collides with other downlink channels, such as a Physical Downlink Control Channel (MPDCCH) under the Internet of Things/a Physical Downlink Shared Channel (MPDSCH) under the Internet of Things, a method for data detection is required so that the user equipment can detect the ACK information from the base station if the G-MPDCCH collides with the MPDCCH/MPDSCH, for example, when monitoring periods of communication channels overlap.

SUMMARY

In view of the above-described problem, the present disclosure provides a method for data detection, and a user equipment thereof.

According to an embodiment of the present disclosure, there is provided a method for data detection used in a user equipment, comprising: monitoring a first communication channel and a second communication channel; and after a monitoring period of the second communication channel starts, when monitoring periods of the first communication channel and the second communication channel overlap, performing the data detection according to priorities between the channels; wherein, the second communication channel is used to transmit information to a group of user equipments in one transmission, and the information is acknowledge information transmitted by a base station for acknowledgement of reception of uplink data.

Furthermore, in the method for data detection according to an embodiment of the present disclosure, a priority of the second communication channel is not lower than a priority of the first communication channel. In the method for data detection according to an embodiment of the present disclosure, the performing the data detection includes: when the first communication channel and the second communication channel are located in a same frequency band, detecting data of the two channels within the monitoring period of the second communication channel; and after the monitoring period of the second communication channel ends, only detecting the data of the first communication channel. In the method for data detection according to an embodiment of the present disclosure, the performing the data detection includes: when the first communication channel and the second communication channel are located in different frequency bands, the priority of the second communication channel is higher than the priority of the first communication channel, detecting data of the second communication channel at a frequency band in which the second communication channel is located within the monitoring period of the second communication channel; and after the monitoring period of the second communication channel ends, jumping to a frequency band in which the first communication channel is located to detect data of the first communication channel. In the method for data detection according to an embodiment of the present disclosure, the performing the data detection includes: when the first communication channel and the second communication channel are located in different frequency bands, simultaneously detecting data of the second communication channel and data of the first communication channel within the monitoring period of the second communication channel after the data of the first communication channel is moved from the first communication channel to the second communication channel by the base station, and jumping to the frequency band in which the first communication channel is located to detect the data of the first communication channel after the monitoring period of the second communication channel ends.

Furthermore, in a method for data detection according to another embodiment of the present disclosure, wherein a priority of the second communication channel is lower than a priority of the first communication channel. In the method for data detection according to an embodiment of the present disclosure, the performing the data detection includes: when the first communication channel and the second communication channel are located in a same frequency band, detecting the data of the first communication channel preferentially; and continuing to detect the data of the second communication channel after the detection of the first communication channel ends. In the method for data detection according to an embodiment of the present disclosure, the performing data detection includes: when the first communication channel and the second communication channel are located in different frequency bands, detecting the data of the first communication channel preferentially; and jumping to the frequency band in which the second communication channel is located to detect the data of the second communication channel after the detection of the first communication channel ends.

Furthermore, in the method for data detection according to the embodiment of the present disclosure, the first communication channel is a physical downlink control channel under the Internet of Things, and the second communication channel is a group-based physical downlink control channel under the Internet of Things.

Furthermore, in the method for data detection according to another embodiment of the present disclosure, the first communication channel is a physical downlink shared channel under the Internet of Things, and the second communication channel is a group-based physical downlink control channel under the Internet of Things.

Furthermore, in the method for data detection according to the embodiment of the present disclosure, the second communication channel is continuously monitored after the monitoring period starts, or the second communication channel is monitored at a predetermined time point after the monitoring period starts.

According to an embodiment of the present disclosure, there is provided a user equipment, comprising: a monitoring unit, configured to monitor a first communication channel and a second communication channel; and a detecting unit, configured to perform data detection according to priorities of the channels when monitoring periods of the first communication channel and the second communication channel overlap, after a monitoring period of the second communication channel starts; wherein, the second communication channel is used to transmit information to a group of user equipments in one transmission, and the information is acknowledge information transmitted by a base station for acknowledgement of reception of uplink data.

Furthermore, in the user equipment according to an embodiment of the present disclosure, a priority of the second communication channel is not lower than a priority of the first communication channel. In the user equipment according to an embodiment of the present disclosure, when the first communication channel and the second communication channel are located in a same frequency band, the detecting unit detects data of the two channels within the monitoring period of the second communication channel; and after the monitoring period of the second communication channel ends, only detects data of the first communication channel. In the user equipment according to an embodiment of the present disclosure, when the first communication channel and the second communication channel are located in different frequency bands, the priority of the second communication channel is higher than the priority of the first communication channel, the detecting unit detects the data of the second communication channel in a frequency band in which the second communication channel is located within the monitoring period of the second communication channel, and jumps to a frequency band in which the first communication channel is located to detect the data of the first communication channel after the monitoring period of the second communication channel ends. In the user equipment according to an embodiment of the present disclosure, when the first communication channel and the second communication channel are located in different frequency bands, the detecting unit simultaneously detects the data of the second communication channel and data of the first communication channel within the monitoring period of the second communication channel after the data of the first communication channel is moved by the base station from the first communication channel to the second communication channel, and jumps to the frequency band in which the first communication channel is located to detect the data of the first communication channel after the monitoring period of the second communication channel ends.

Furthermore, in a user equipment according to another embodiment of the present disclosure, a priority of the second communication channel is lower than a priority of the first communication channel. In the user equipment according to an embodiment of the present disclosure, when the first communication channel and the second communication channel are located in a same frequency band, the detecting unit preferentially detects the data of the first communication channel, and continues to detect the data of the second communication channel after the detection of the first communication channel ends. In the user equipment according to an embodiment of the present disclosure, when the first communication channel and the second communication channel are located in different frequency bands, the detecting unit preferentially detects the data of the first communication channel, and jumps to the frequency band in which the second communication channel is located to detect the data of the second communication channel after the detection of the first communication channel ends, Furthermore, in a user equipment according to an embodiment of the present disclosure, the first communication channel is a physical downlink control channel under the Internet of Things, and the second communication channel is a group-based physical downlink control channel under the Internet of Things.

Furthermore, in a user equipment according to another embodiment of the present disclosure, the first communication channel is a physical downlink shared channel under the Internet of Things, and the second communication channel is a group-based physical downlink control channel under the Internet of Things.

Furthermore, in a user equipment according to an embodiment of the present disclosure, the second communication channel is continuously monitored after the monitoring period starts, or the second communication channel is monitored at a predetermined time point after the monitoring period starts.

In the method for data detection and the user equipment thereof according to the embodiments of the present disclosure, the data is detected according to the priorities of the communication channels, which realizes a detection of acknowledge information transmitted by the base station for the reception of uplink data, when the communication channels collide with each other.

It should be understood that, both the general description above and the detailed description below are exemplary and intended to provide further explanations of the technologies that require protection.

BRIEF DESCRIPTION OF THE DRAWINGS

By describing embodiments of the present disclosure in more detail in conjunction with the drawings, the above and other objects, features and advantages of the present disclosure will become more obvious. The drawings are provided for further understanding of the embodiments of the present disclosure and constitute a part of the specification, and are used for explaining the present disclosure together with the embodiments of the present disclosure rather than limiting the present disclosure. In the drawings, same reference signs usually denote same components or steps.

DETAILED DESCRIPTION

In order to make objects, technical solutions and advantages of the present disclosure apparent, the exemplary embodiments of the present disclosure will be described in detail with reference to the drawings. It is obvious that the described embodiments are just a part but not all of the embodiments of the present disclosure. It should be understood that, the present disclosure is not limited by the exemplary embodiments described here. Based on the described embodiments herein, those skilled in the art can obtain other embodiment(s), without any inventive work, which should be within the scope of the present disclosure.

Figure 1:
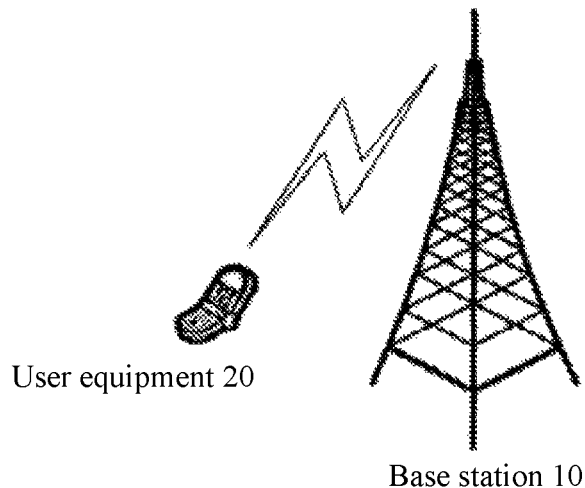
FIG. 1 is a schematic diagram summarizing a communication system according to an embodiment of the present disclosure.

FIG. 1 is a schematic diagram summarizing a communication system according to an embodiment of the present disclosure. As shown in FIG. 1, the communication system according to the embodiment of the present disclosure comprises a base station (eNB) 10 and a user equipment (UE) 20. The base station 10 and the user equipment 20 execute transmission and reception of communication signals based on predetermined protocols on predetermined communication channels.

The present disclosure may be applied to a scenario based on an Internet of Things (IoT), in order that the user equipment can detect ACK acknowledgement information fed back by the base station for reception of uplink data in such an application scenario.

Figure 2:
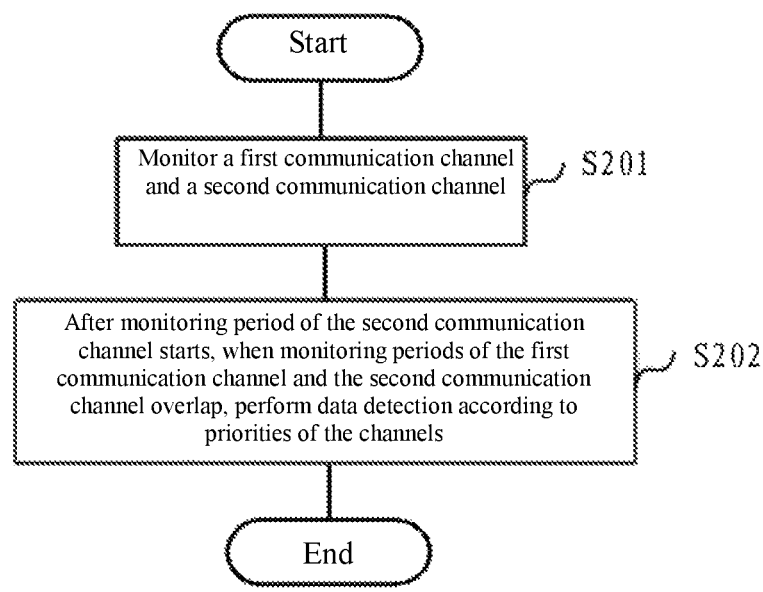
FIG. 2 is a flow chart illustrating a method for data detection used in a user equipment according to an embodiment of the present disclosure.

Firstly, a method for data detection used in a user equipment according to an embodiment of the present disclosure will be described with reference to FIG. 2. The method for data detection according to the embodiment of the present disclosure comprises steps as follows.

In step S201, a first communication channel and a second communication channel are monitored.

In step S202, after a monitoring period of the second communication channel starts, when monitoring periods of the first communication channel and the second communication channel overlap, the data detection is performed according to priorities between/among channels.

In an implementation, the second communication channel is used to transmit information to a group of user equipments in one transmission, and the information is acknowledge information transmitted by the base station for reception of uplink data.

In an implementation, the first communication channel corresponds to a MPDCCH or a MPDSCH, the second communication channel corresponds to a G-MPDCCH, and priorities of different communication channels are different.

The method for data detection used in the user equipment according to the embodiment of the present disclosure is applicable to two monitoring scenarios of: 1. continuously monitoring the second communication channel after a monitoring period starts, and 2. monitoring the second communication channel at a predetermined time point after the monitoring period starts.

FIG. 3 to FIG. 6B depict a first embodiment of the method for data detection used in the user equipment according to an embodiment of the present disclosure. In the first embodiment of the method for data detection used in the user equipment according to the embodiment of the present disclosure, the first communication channel is a MPDCCH, and the second communication channel is a G-MPDCCH.

Figure 3:
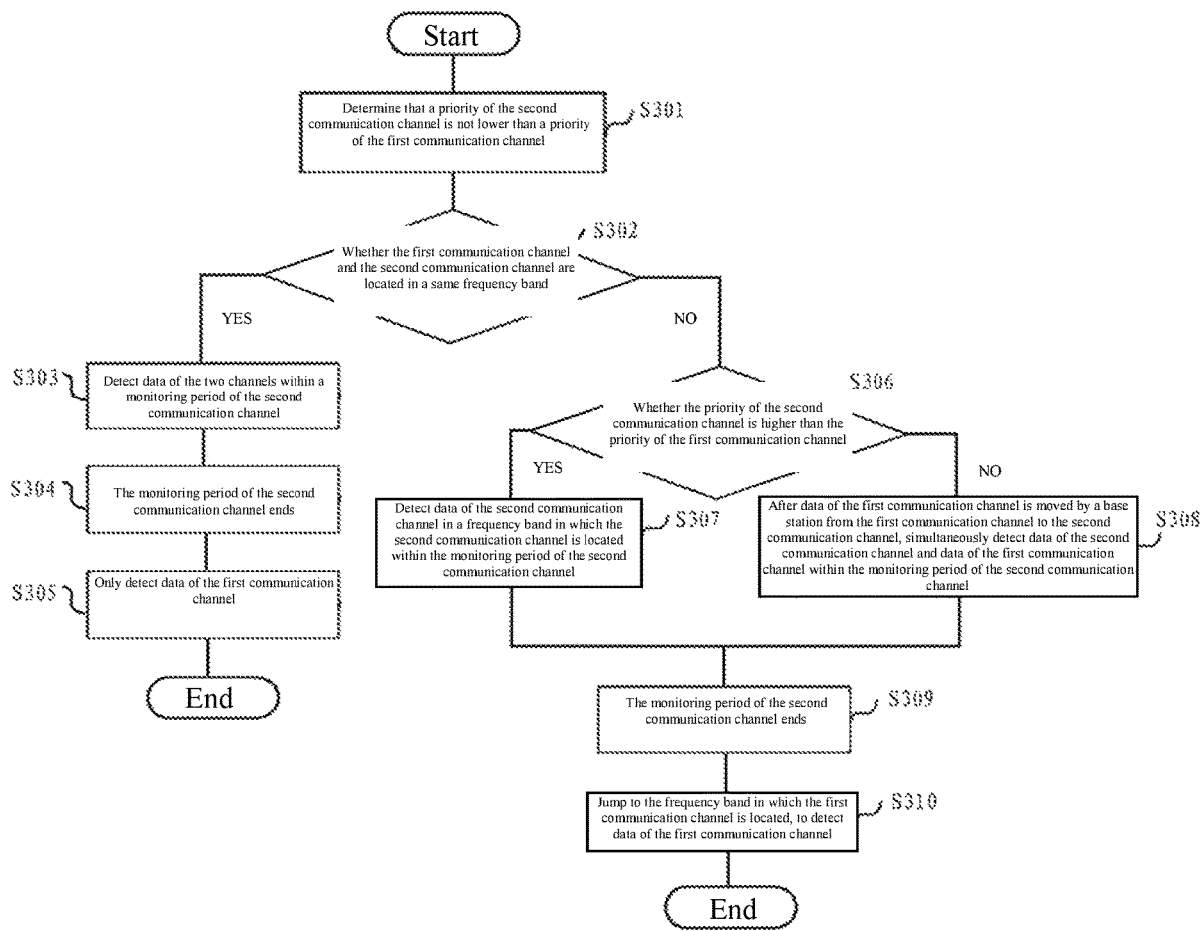
FIG. 3 is a flow chart illustrating a first embodiment of the method for data detection used in the user equipment according to an embodiment of the present disclosure.

FIG. 3 is a flow chart illustrating the first embodiment of the method for data detection used in the user equipment according to the embodiment of the present disclosure. As shown in FIG. 3, the first embodiment of the method for data detection according to the embodiment of the present disclosure comprises steps as follows.

In step S301, it is determined that the priority of the second communication channel is not lower than the priority of the first communication channel.

In step S302, it is judged whether the first communication channel and the second communication channel are located in a same frequency band. If the first communication channel and the second communication channel are located in the same frequency band, the processing proceeds to step S303. If the first communication channel and the second communication channel are located in different frequency bands, the processing proceeds to step S306.

In step S303, data of the two channels are detected within a monitoring period of the second communication channel. Specifically, within the monitoring period of the second communication channel, the user equipment simultaneously monitors the first communication channel and the second communication channel, and detects data in the channels.

In step S304, after the monitoring period of the second communication channel ends, then in step S305, the user equipment only detects the data of the first communication channel.

In step S306, it is further determined whether the priority of the second communication channel is higher than the priority of the first communication channel. If the priority of the second communication channel is higher than the priority of the first communication channel, the processing proceeds to step S307. If the priority of the second communication channel is not higher than the priority of the first communication channel, the processing proceeds to step S308.

In step S307, the data of the second communication channel is detected in a frequency band in which the second communication channel is located within the monitoring period of the second communication channel. Specifically, within the monitoring period of the second communication channel, the user equipment only monitors the frequency band in which the second communication channel is located, and detects the data in the channel.

In step S308, after the data of the first communication channel is moved by the base station from the first communication channel to the second communication channel, the data of the second communication channel and the data of the first communication channel are simultaneously detected within the monitoring period of the second communication channel. Specifically, within the monitoring period of the second communication channel, the user equipment simultaneously detects the data of the second communication channel and the data of the first communication channel in the frequency band in which the second communication channel is located.

In step S309, after the monitoring period of the second communication channel ends, then in step S310, the data of the first communication channel is detected by jumping to the frequency band in which the first communication channel is located.

In the first embodiment of the method for data detection used in the user equipment according to the embodiment of the present disclosure as shown in FIG. 3, after it is determined that the priority of the first communication channel is not lower than the priority of the second communication channel, a detection of the data is determined according to the different frequency bands in which the channels are located and a relationship between priorities of the communication channels, so that if the communication channels collide with each other, for example, the monitoring periods of the communication channels overlap, the user equipment can detect the acknowledge information transmitted by the base station for the reception of uplink data.

Hereinafter, starting of the monitoring period, and the method for monitoring communication channels and for data detection will be described with reference to an example combined with detailed detection processes.

Figure 4A:
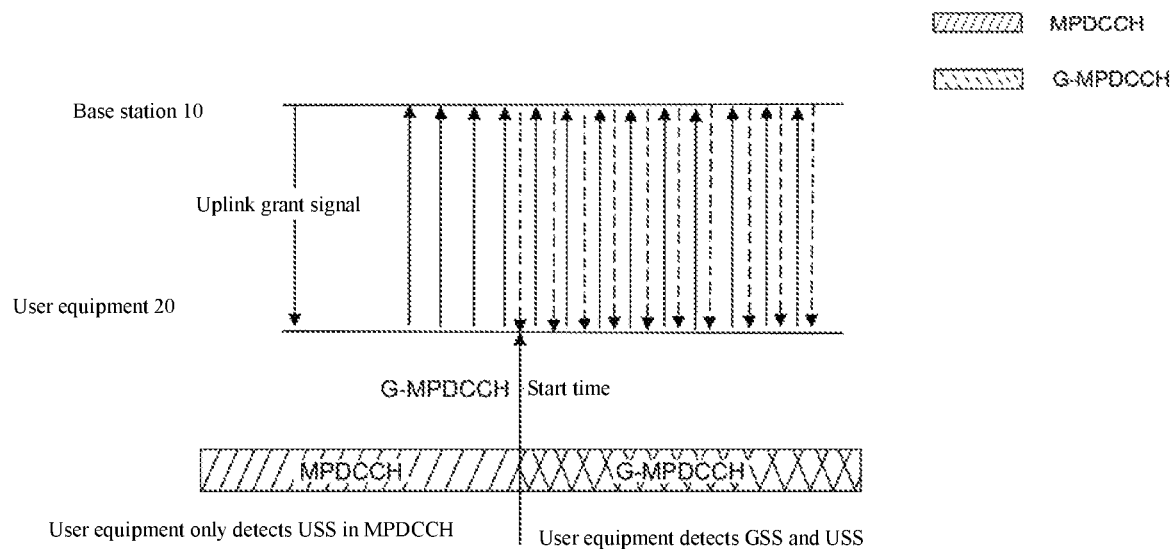
FIG. 4A and FIG. 4B are schematic diagrams illustrating a first example according to the first embodiment of the present disclosure.
Figure 4B:
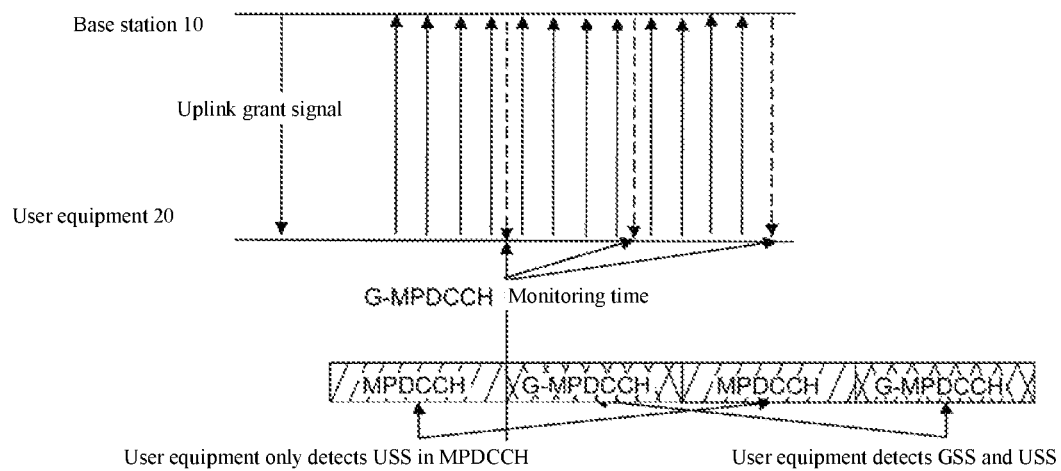

FIG. 4A and FIG. 4B are respectively schematic diagrams illustrating a first example according to the first embodiment of the present disclosure.

A scenario shown in FIG. 4A is that: the MPDCCH and the G-MPDCCH are located in a same frequency band, and the user equipment continuously monitors the G-MPDCCH after a monitoring period of the G-MPDCCH starts (for example, a G-MPDCCH start time in FIG. 4A).

Specifically, before the monitoring period of the G-MPDCCH starts, the user equipment only detects data in the MPDCCH; and after the monitoring period of the G-MPDCCH starts, the user equipment starts to simultaneously monitor the MPDCCH and the G-MPDCCH. Within the monitoring period of the G-MPDCCH, the user equipment detects two pieces of downlink control information (DCI), that is, the user equipment simultaneously detects a Group Search Space (GSS) of the G-MPDCCH and a User Search Space (USS) of the MPDCCH. After the monitoring period of the G-MPDCCH ends, the user equipment only detects the USS of the MPDCCH.

A scenario shown in FIG. 4B is that: the MPDCCH and the G-MPDCCH are located in a same frequency band, and the user equipment monitors the G-MPDCCH at a predetermined time point (for example, a G-MPDCCH monitoring time in FIG. 4B) after the monitoring period the G-MPDCCH starts.

Specifically, before the monitoring period of the G-MPDCCH starts, the user equipment only detects the data in the MPDCCH. Within the monitoring period of the G-MPDCCH, the user equipment simultaneously monitors the MPDCCH and the G-MPDCCH, and the user equipment simultaneously detects the GSS and the USS. After the monitoring period of the G-MPDCCH ends, the user equipment only detects the USS.

Figure 5A:
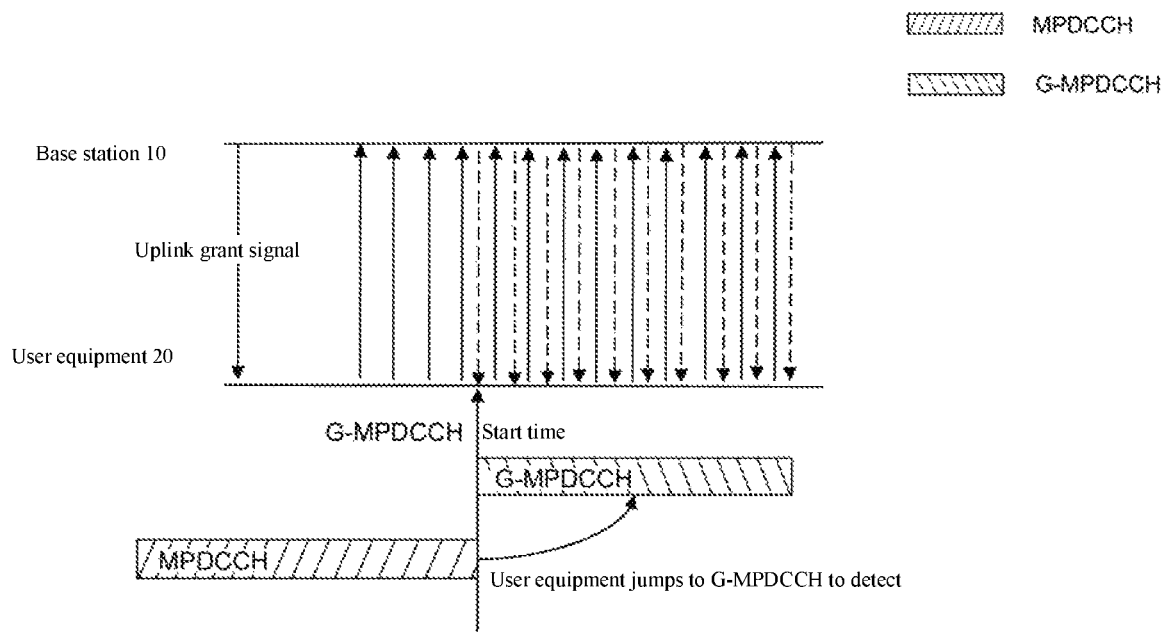
FIG. 5A and FIG. 5B are schematic diagrams illustrating a second example according to the first embodiment of the present disclosure.
Figure 5B:
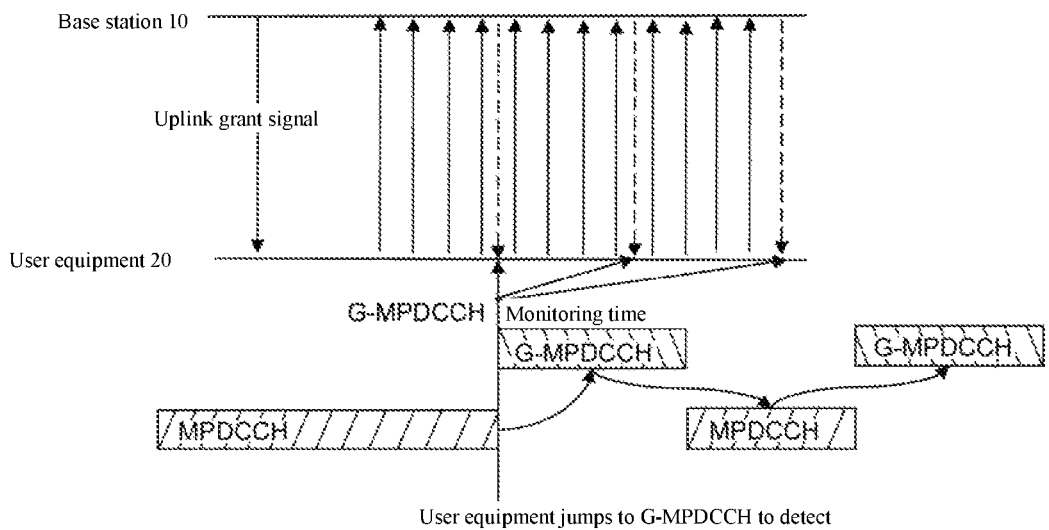

FIG. 5A and FIG. 5B are respectively schematic diagrams illustrating a second example according to the first embodiment of the present disclosure.

A scenario shown in FIG. 5A is that: the MPDCCH and the G-MPDCCH are located in different frequency bands, and the priority of the G-MPDCCH is higher than the priority of the MPDCCH. The user equipment continuously monitors the G-MPDCCH after the monitoring period of the G-MPDCCH starts (for example, a G-MPDCCH start time in FIG. 5A).

Specifically, before the monitoring period of the G-MPDCCH starts, the user equipment only detects the data in the MPDCCH in the frequency band in which the MPDCCH is located; and after the monitoring period of the G-MPDCCH starts, the user equipment jumps to the frequency band in which the G-MPDCCH is located to detect the GSS of the G-MPDCCH. After the monitoring period of the G-MPDCCH ends, the user equipment jumps back to the frequency band in which the MPDCCH is located to detect data therein.

A scenario shown in FIG. 5B is that: the MPDCCH and the G-MPDCCH are located in different frequency bands, and the priority of the G-MPDCCH is higher than the priority of the MPDCCH. The user equipment monitors the G-MPDCCH at a predetermined time point (for example, a G-MPDCCH monitoring time in FIG. 5B) after the monitoring period of the G-MPDCCH starts.

Specifically, before the monitoring period of the G-MPDCCH starts, the user equipment only detects in data in the MPDCCH in the frequency band in which the MPDCCH is located; and within the monitoring period of the G-MPDCCH, the user equipment jumps to the frequency band in which the G-MPDCCH is located to detect the data of the G-MPDCCH. At other time which does not overlap with the monitoring period of the G-MPDCCH, the user equipment jumps back to the frequency band in which the MPDCCH is located to detect the data therein.

Figure 6A:
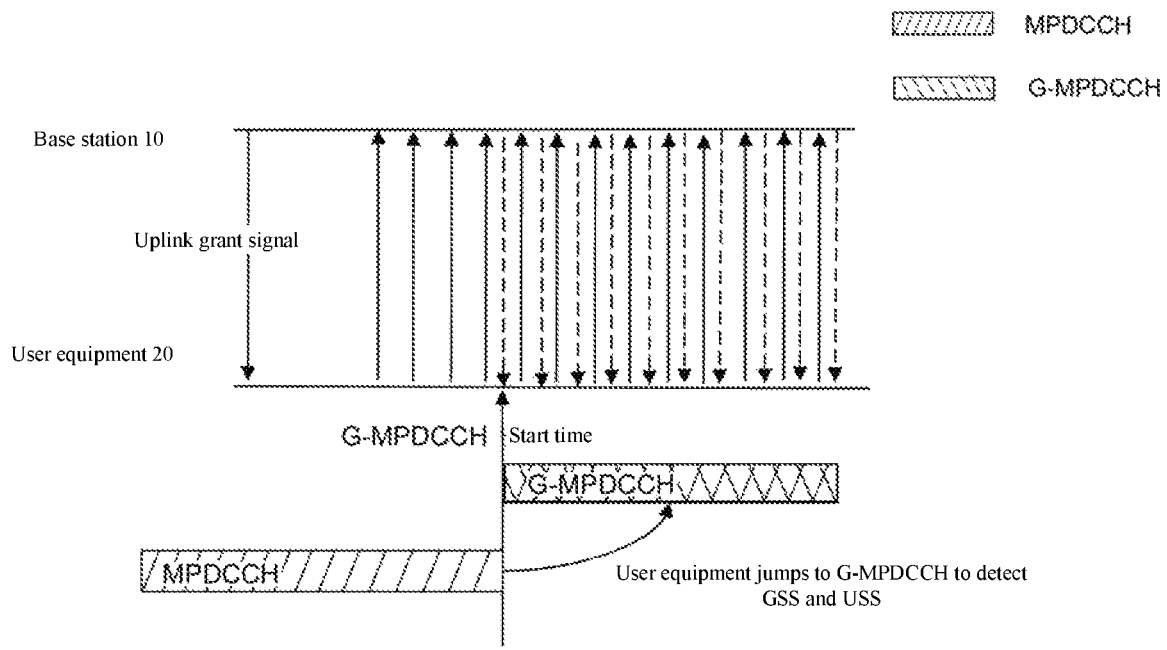
FIG. 6A and FIG. 6B are schematic diagrams illustrating a third example according to the first embodiment of the present disclosure.
Figure 6B:
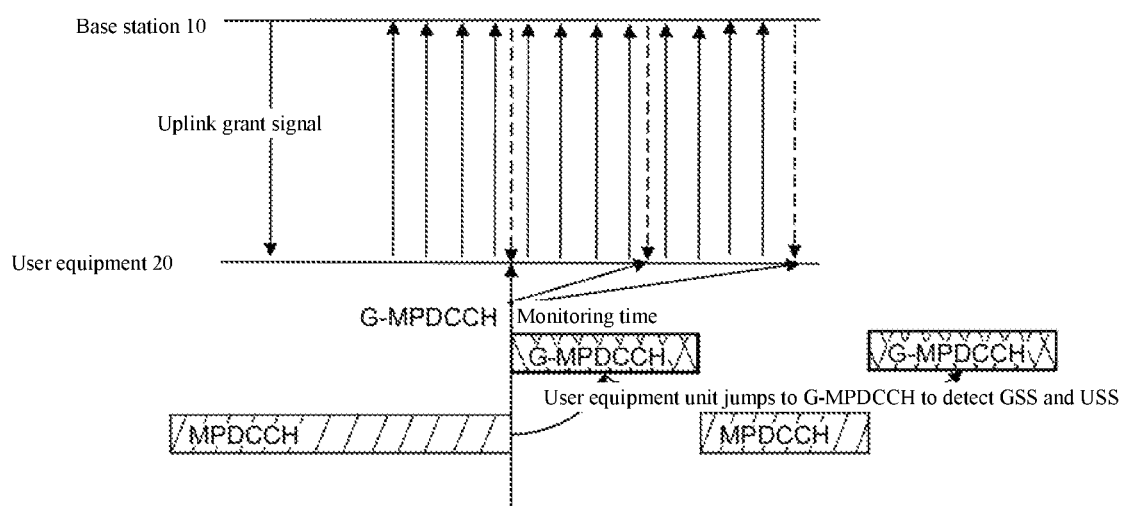

FIG. 6A and FIG. 6B are respectively schematic diagrams illustrating a third example according to the first embodiment of the present disclosure.

A scenario shown in FIG. 6A is that: the MPDCCH and the G-MPDCCH are located in different frequency bands, and the user equipment continuously monitors the G-MPDCCH after the monitoring period of the G-MPDCCH starts (for example, a G-MPDCCH start time in FIG. 6A).

Specifically, before the monitoring period of the G-MPDCCH starts, the user equipment only detects data in the MPDCCH in the frequency band in which the MPDCCH is located; and when the monitoring period of the G-MPDCCH starts, after the base station moves the data of the MPDCCH (for example, DCI or other user-specific information) from the MPDCCH to the USS in the G-MPDCCH, the user equipment can simultaneously detect the data of the MPDCCH (i.e., the USS) and the data of the G-MPDCCH (i.e., the GSS) by only monitoring the frequency band in which the G-MPDCCH is located. After the monitoring period of the G-MPDCCH ends, the user equipment jumps back to the frequency band in which the MPDCCH is located to detect the data therein.

A scenario shown in FIG. 6B is that: the MPDCCH and the G-MPDCCH are located in different frequency bands, and the user equipment monitors the G-MPDCCH at a predetermined time point (for example, a G-MPDCCH monitoring time in FIG. 6B) after the monitoring period of the G-MPDCCH starts.

Specifically, before the monitoring period of the G-MPDCCH starts, the user equipment only detects the data in the MPDCCH in the frequency band in which the MPDCCH is located; and within the monitoring period of the G-MPDCCH, after the base station moves the data of the MPDCCH (for example, the DCI or other user-specific information) from the MPDCCH to the USS in the G-MPDCCH, the user equipment can simultaneously detect the data of the MPDCCH (i.e., the USS) and the data of the G-MPDCCH (i.e., the GSS) by only monitoring the frequency band in which the G-MPDCCH is located. At other time which does not overlap with the monitoring period of the G-MPDCCH, the user equipment jumps back to the frequency band in which the MPDCCH is located to detect the data therein.

FIG. 7 to FIG. 9B depict a second embodiment of the method for data detection used in the user equipment according to an embodiment of the present disclosure. In the second embodiment of the method for data detection used in the user equipment according to the embodiment of the present disclosure, a first communication channel is a MPDSCH, and a second communication channel is a G-MPDCCH.

Figure 7:
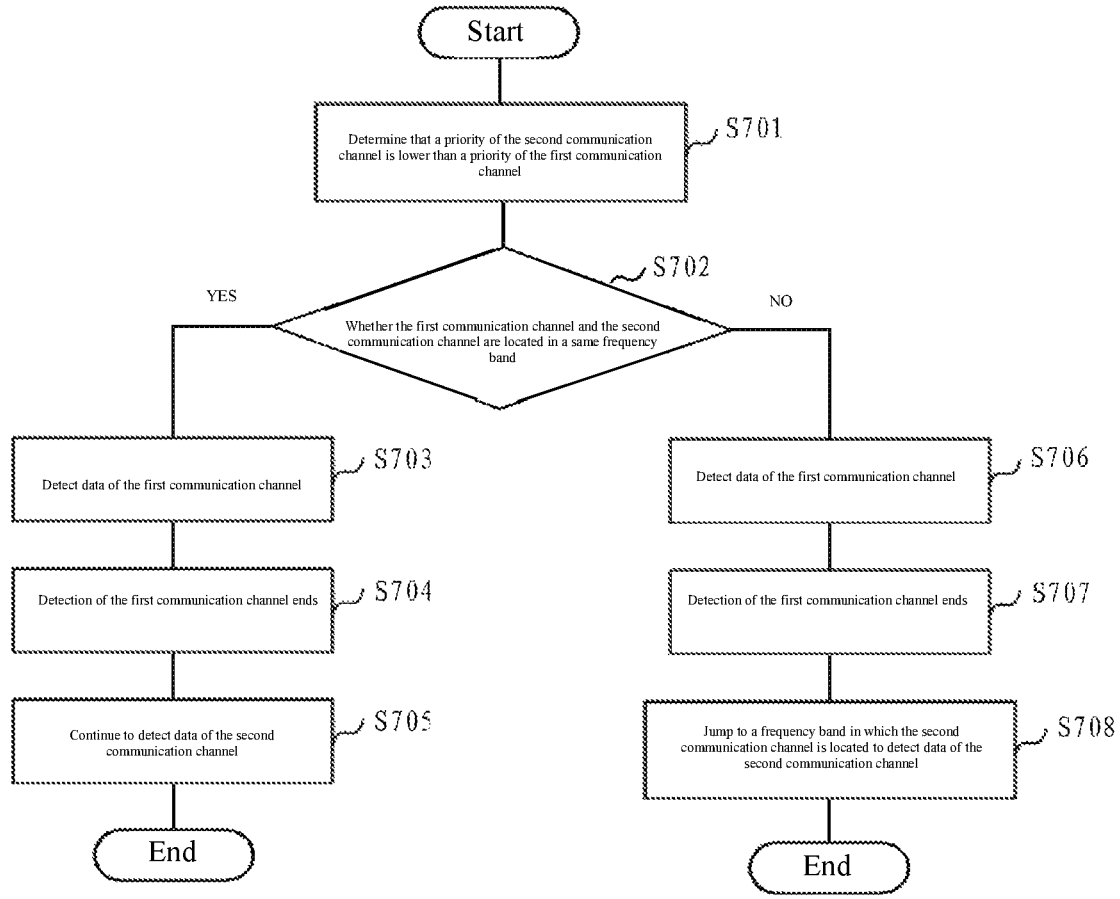
FIG. 7 is a flow chart illustrating a second embodiment of the method for data detection used in the user equipment according to an embodiment of the present disclosure.

FIG. 7 is a flow chart illustrating the second embodiment of the method for data detection used in the user equipment according to the embodiment of the present disclosure. As shown in FIG. 7, the second embodiment of the method for data detection according to the embodiment of the present disclosure comprises steps as follows.

In step S701, it is determined that the priority of the second communication channel is lower than the priority of the first communication channel.

In step S702, it is determined whether the first communication channel and the second communication channel are located in the same frequency band. If the first communication channel and the second communication channel are located in the same frequency band, the processing proceeds to step S703. If the first communication channel and the second communication channel are located in different frequency bands, the processing proceeds to step S706.

In step S703, the data of the first communication channel is preferentially detected.

In step S704, after the detection of the first communication channel ends, then in step S705, the user equipment detects the data of the second communication channel.

In step S706, the data of the first communication channel is preferentially detected.

In step S707, after the detection of the first communication channel ends, then in step S708, the user equipment jumps to the frequency band in which the second communication channel is located to detect the data of the second communication channel.

In the second embodiment of the method for data detection used in the user equipment according to the embodiment of the present disclosure as shown in FIG. 7, the priority of the first communication channel is higher than the priority of the second communication channel, and the detection of data is determined according to the different frequency bands in which the communication channels are located, so that if the communication channels collide with each other, for example, if the monitoring periods of the communication channels overlap, the user equipment can detect the acknowledge information transmitted by the base station for the reception of uplink data.

Hereinafter, starting of the monitoring period, and the method for monitoring communication channels and for data detection will be described further with reference to an example combined with detailed detection processes.

Figure 8A:
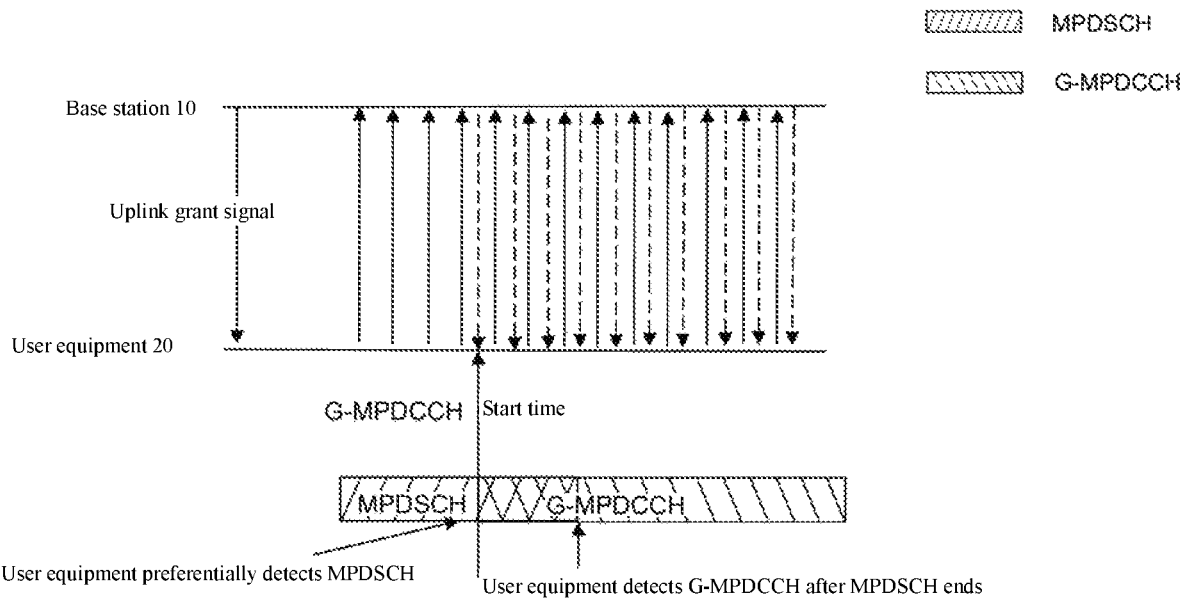
FIG. 8A and FIG. 8B are schematic diagrams illustrating a first example according to the second embodiment of the present disclosure.
Figure 8B:
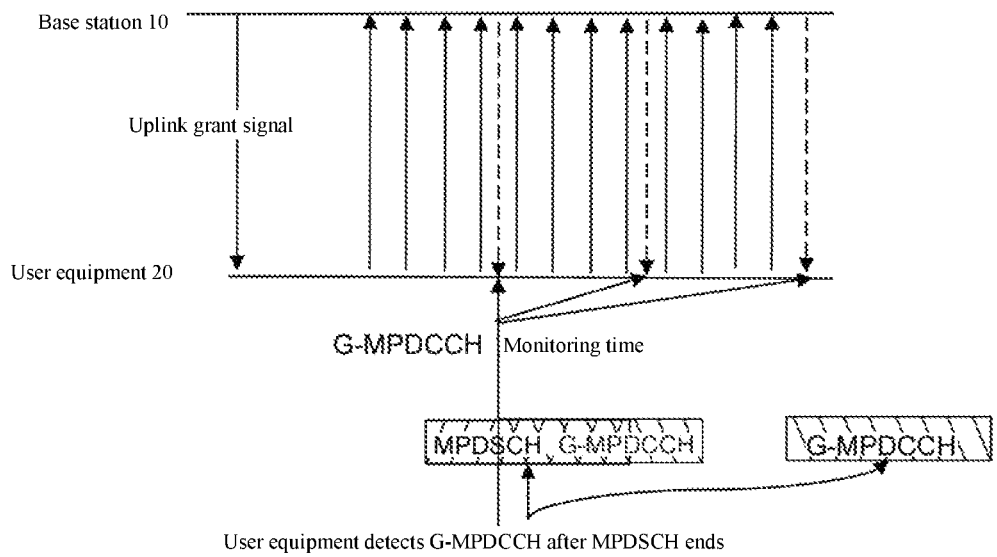

FIG. 8A and FIG. 8B are respectively schematic diagrams illustrating a first example according to the second embodiment of the present disclosure.

A scenario shown in FIG. 8A is that: the MPDSCH and the G-MPDCCH are located in the same frequency band, and the user equipment continuously monitors the G-MPDCCH after the monitoring period of the G-MPDCCH starts (for example, a G-MPDCCH start time in FIG. 8A).

Specifically, before the monitoring period of the G-MPDCCH starts, the user equipment only detects the data in the MPDSCH; and after the monitoring period of the G-MPDCCH starts, when the monitoring periods of the G-MPDCCH and the MPDSCH overlap, the user equipment preferentially detects the data in the MPDSCH, and detects the data in the G-MPDCCH after the data detection in the MPDSCH ends.

A scenario shown in FIG. 8B is that: the MPDSCH and the G-MPDCCH are located in the same frequency band, and the user equipment monitors the G-MPDCCH at a predetermined time point (for example, a G-MPDCCH monitoring time in FIG. 8B) after the monitoring period of the G-MPDCCH starts.

Specifically, before the monitoring period of the G-MPDCCH starts, the user equipment only detects data in the MPDSCH; and after the monitoring period of the G-MPDCCH starts, when the monitoring periods of the G-MPDCCH and the MPDSCH overlap, the user equipment preferentially detects the data in the MPDSCH, and detects the data in the G-MPDCCH after the data detection in the MPDSCH ends.

Figure 9A:
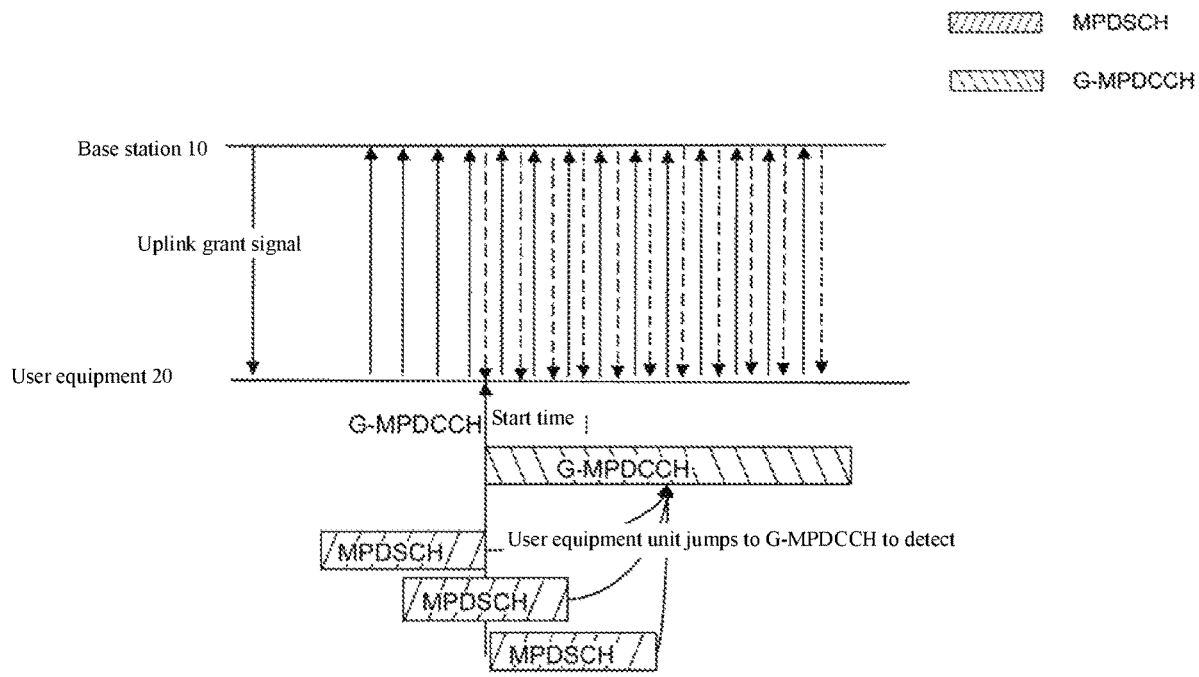
FIG. 9A and FIG. 9B are schematic diagrams illustrating a second example according to the second embodiment of the present disclosure.
Figure 9B:
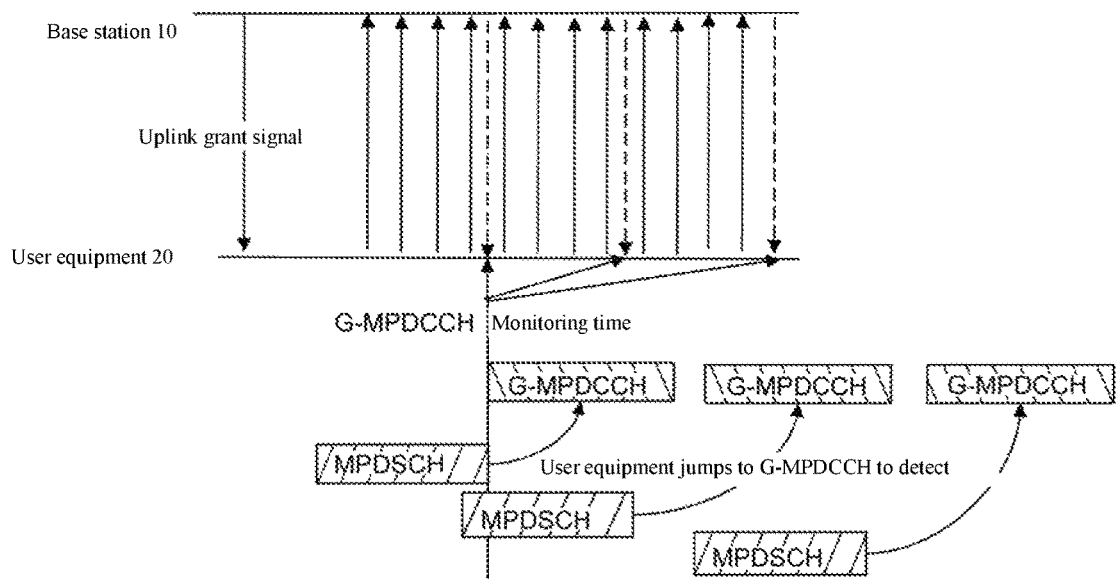

FIG. 9A and FIG. 9B are respectively schematic diagrams illustrating a second example according to the second embodiment of the present disclosure.

A scenario shown in FIG. 9A is that: the MPDSCH and the G-MPDCCH are located in different frequency bands, and the user equipment continuously monitors the G-MPDCCH after the monitoring period of the G-MPDCCH starts (for example, a G-MPDCCH start time in FIG. 9A).

Specifically, before the monitoring period of the G-MPDCCH starts, the user equipment only detects the data in the MPDSCH; after the monitoring period of the G-MPDCCH starts, when the monitoring periods of the G-MPDCCH and the MPDSCH overlap, the user equipment preferentially detects the data in the MPDSCH; and after the data detection in the MPDSCH ends, the user equipment jumps back to the frequency band in which the G-MPDCCH is located to detect the data therein.

A scenario shown in FIG. 9B is that: the MPDSCH and the G-MPDCCH are located in different frequency bands, and the user equipment monitors the G-MPDCCH at a predetermined time point (for example, a G-MPDCCH monitoring time in FIG. 9B) after the monitoring period of the G-MPDCCH starts.

Specifically, before the monitoring period of the G-MPDCCH starts, the user equipment only detects the data in the MPDSCH in the frequency band in which the MPDSCH is located; when the monitoring periods of the G-MPDCCH and the MPDSCH overlap, the user equipment preferentially detects the data in the frequency band of the MPDSCH; and at other time which does not overlap with the monitoring period of the MPDSCH, the user equipment jumps back to the frequency band in which the G-MPDCCH is located to detect the data therein.

Figure 10:
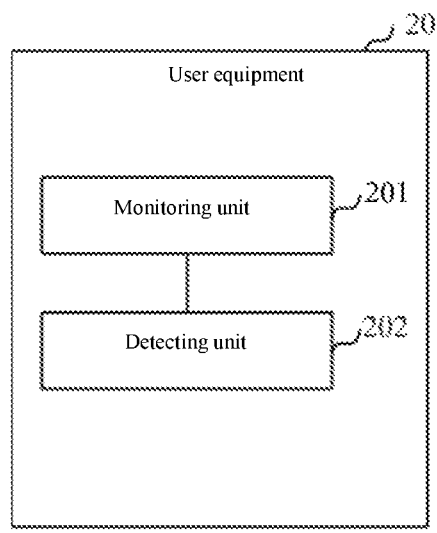
FIG. 10 is a block diagram illustrating a user equipment according to an embodiment of the present disclosure.

FIG. 10 is a block diagram illustrating a user equipment according to an embodiment of the present disclosure. As shown in FIG. 10, the user equipment 20 according to the embodiment of the present disclosure comprises a monitoring unit 201 and a detecting unit 202.

Specifically, the monitoring unit 201 is configured to monitor the first communication channel and the second communication channel. The detecting unit 202 is configured to, after the monitoring period of the second communication channel starts, perform the data detection according to the priorities between the channels when the monitoring periods of the first communication channel and the second communication channel overlap. Wherein, the second communication channel is used to transmit information to a group of user equipments in one transmission, and the information is acknowledge information transmitted by the base station 10 for the reception of uplink data.

Further, the priority of the second communication channel may be not lower than the priority of the first communication channel. Wherein, when the first communication channel and the second communication channel are located in the same frequency band, the detecting unit 202 detects the data of the two channels within the monitoring period of the second communication channel; and after the monitoring period of the second communication channel ends, only detects the data of the first communication channel. Wherein, when the first communication channel and the second communication channel are located in different frequency bands, if the priority of the second communication channel is higher than the priority of the first communication channel, the detecting unit 202 detects the data of the second communication channel in the frequency band in which the second communication channel is located within the monitoring period of the second communication channel; and after the monitoring period of the second communication channel ends, jumps to the frequency band in which the first communication channel is located to detect the data of the first communication channel. Wherein, when the first communication channel and the second communication channel are located in the different frequency bands, after the data of the first communication channel is moved by the base station 10 from the first communication channel to the second communication channel, the detecting unit 202 simultaneously detects the data of the second communication channel and the data of the first communication channel within the monitoring period of the second communication channel; and after the monitoring period of the second communication channel ends, jumps to the frequency band in which the first communication channel is located to detect the data of the first communication channel. Wherein, the first communication channel is a MPDCCH, and the second communication channel is a G-MPDCCH.

Further, the priority of the second communication channel may be lower than the priority of the first communication channel. Wherein when the first communication channel and the second communication channel are located in the same frequency band, the detecting unit 202 preferentially detects the data of the first communication channel; and after the detection of the first communication channel ends, continues to detect the data of the second communication channel. Wherein, when the first communication channel and the second communication channel are located in different frequency bands, the detecting unit 202 preferentially detects the data of the first communication channel; and after the detection of the first communication channel ends, jumps to the frequency band in which the second communication channel is located to detect the data of the second communication channel. Wherein, the first communication channel is a MPDSCH, and the second communication channel is a G-MPDCCH.

Further, the user equipment 20 continuously monitors the second communication channel after the monitoring period starts, or monitors the second communication channel at a predetermined time point after the monitoring period starts.

It should be noted that block diagrams used for the illustration of the above embodiments represent functional blocks in functional units. These functional blocks (components) are realized by any combination of hardware and/or software. In addition, there is no specific limitation on the means for implementing the respective function blocks. That is, the respective functional blocks may be realized by one apparatus that is physically and/or logically aggregated, or may be realized by directly and/or indirectly (for example, wired and/or wireless) connecting two or more physically and/or logically separate apparatuses and using the plurality of apparatuses.

Figure 11:
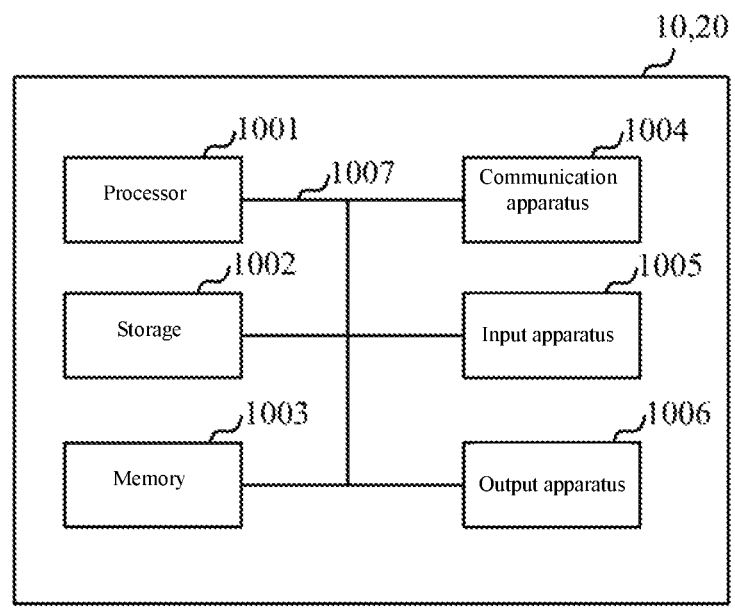
FIG. 11 is a block diagram illustrating an example of hardware configurations of a base station and a user equipment according to an embodiment of the present disclosure.

For example, the base station, the user equipment and so on in the embodiments of the present disclosure may function as a computer that executes the processes of the radio communication method of the present disclosure. FIG. 11 is a block diagram illustrating an example of hardware configurations of the base station and the user equipment according to an embodiment of the present disclosure. The above described base station 10 and user equipment 20 may be physically designed as a computer apparatus including a processor 1001, a storage 1002, a memory 1003, a communication apparatus 1004, an input apparatus 1005, an output apparatus 1006, and a bus 1007 and the like.

It should be noted that, in the following description, the word such as "apparatus" may be replaced by "circuit", "device", "unit" and so on. It should be noted that the hardware structures of the base station 10 and the user equipment 20 may include one or more of each apparatus shown in the drawings, or may not include a part of the apparatus.

For example, although only one processor 1001 is shown, a plurality of processors may be provided. Furthermore, processes may be implemented with one processor, or the processes may be implemented either simultaneously or in sequence, or in different manners, with two or more processors. It should be noted that the processor 1001 may be implemented with one or more chips.

The respective functions of the base station 10 and the user equipment 20 are implemented by reading predetermined software (program) on hardware such as the processor 1001 and the memory 1002, so as to make the processor 1001 perform calculations, and by controlling the communication carried out by the communication apparatus 1004, and the reading and/or writing of data in the memory 1002 and the storage 1003.

The processor 1001 may control the computer as a whole by, for example, running an operating system. The processor 1001 may be configured with a central processing unit (CPU), which includes interfaces with peripheral apparatus, control apparatus, computing apparatus, a register and so on. For example, the reception control unit 103, the retransmission control unit 203, and the like described above may be implemented by the processor 1001.

Furthermore, the processor 1001 reads programs (program codes), software modules or data, from the storage 1003 and/or the communication apparatus 1004, into the memory 1002, and executes various processes according to these. As for the programs, programs to allow computers to execute at least part of the operations of the above-described embodiments may be used. For example, a retransmission control unit 203 of the user equipment 20 may be implemented by a control program stored in the memory 1002 and operated by the processor 1001. For other function blocks, they can also be implemented in the same way. The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may also be referred to as a "register", a "cache", a "main memory" (primary storage apparatus) and so on. The memory 1002 can store executable programs (program codes), software modules and so on for implementing the radio communication methods according to embodiments of the present disclosure.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may also be referred to as "secondary storage apparatus."

The communication apparatus 1004 is hardware (transmitting/receiving device) for allowing inter-computer communication by using wired and/or wireless networks, and may be also referred to as, for example, a "network device", a "network controller", a "network card", a "communication module" and so on. The communication apparatus 1004 may include a high frequency switch, a duplexor, a filter, a frequency synthesizer, and the like, in order to realize, for example, Frequency Division Duplex (FDD) and/or Time Division Duplex (TDD). For example, the above-described transmitting unit 101, the receiving unit 102, the receiving unit 201, the transmitting unit 202, and the like may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). It should be noted that the input apparatus 1005 and the output apparatus 1006 may be provided in an integrated structure (for example, a touch panel).

Furthermore, these apparatus, including the processor 1001, the memory 1002 and so on, are connected by the bus 1007 so as to communicate information. The bus 1007 may be formed with a single bus, or may be formed with different buses among the apparatus.

Also, the base station 10 and the user equipment 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be installed with at least one of these pieces of hardware.

The method for data detection and the user equipment according to the embodiments of the present disclosure are described above with reference to FIG. 1 to FIG. 11, and the detection of data is determined according to the different frequency bands in which the communication channels are located and the relationship between the priorities of the communication channels, so that if the communication channels collide with each other, for example, if the monitoring periods of the communication channels overlap, the user equipment can detect the acknowledge information transmitted by the base station for reception of uplink data.

It should be noted that the terms illustrated in the present specification and/or the terms required for the understanding of the present specification may be substituted with terms having the same or similar meaning. For example, a channel and/or a symbol may be a signal. In addition, the signal may be a message. A reference signal may be abbreviated as an "RS (Reference Signal)", and may be referred to as a "pilot", a "pilot signal" and so on, depending on which standard applies. In addition, a component carrier (CC) may be also referred to as a cell, a frequency carrier, a carrier frequency, or the like.

Also, the information and parameters and so on described in this specification may be represented in absolute values or in relative values with respect to predetermined values, or may be represented in corresponding other information. For example, radio resources may be indicated by predetermined indices. In addition, equations to use these parameters and so on may be used, apart from those explicitly disclosed in this specification.

The names used for parameters and so on in this specification are not limited in any respect. For example, various channels (the Physical Uplink Control Channel (PUCCH), the Physical Downlink Control Channel (PDCCH), the Physical Downlink Shared Channel (PDSCH) and so on) and information elements can be identified by any suitable names, therefore the various names assigned to these various channels and information elements are not limited in any respect.

The information, signals and so on described in this specification may be represented by using any one of various different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and/or output via a plurality of network nodes.

The information, signals and so on that are input and/or output may be stored in a specific location (for example, in a memory), or may be managed in a management table. The information, signals and so on that are input and/or output may be overwritten, updated or appended. The information, signals and so on that are output may be deleted. The information, signals and so on that are input may be transmitted to other apparatus.

Notification of information is by no means limited to the aspects/embodiments described in this specification, and other methods may be used as well. For example, the notification of information may be implemented by using a physical layer signaling (for example, a downlink control information (DCI), an uplink control information (UCI)), a higher layer signaling (for example, a Radio Resource Control (RRC) signaling, a broadcast information (a master information block (MIB), a system information blocks (SIBS) and so on), a Medium Access Control (MAC) signaling and so on), and other signals and/or combinations of these.

It should be noted that a physical layer signaling may also be referred to as a L1/L2 (Layer 1/Layer 2) control information (a L1/L2 control signals), a L1 control information (a L1 control signal) and so on. Also, the RRC signaling may also be referred to as "a RRC message", and can be, for example, a RRC connection setup message, a RRC connection reconfiguration message, and so on. Also, the MAC signaling may be notified using, for example, MAC control elements (MAC CEs).

In addition, notification of predetermined information (for example, notification of "ACK" or "NACK") is not limited to an explicit notification, but may be performed by an implicitly notification (for example, by not performing the notification of the predetermined information, or by a notification of other information).

Determination may be performed using a value (0 or 1) indicated by 1 bit, may be performed using a Boolean value (true or false), or may be performed by comparison of numerical values (for example, comparison with a predetermined value).

Software, whether referred to as "software", "firmware", "middleware", "microcode" or "hardware description language", or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when the software is transmitted from a website, a server or other remote sources by using wired technologies (coaxial cables, optical fiber cables, twisted-pair cables, digital subscriber lines (DSLs) and so on) and/or wireless technologies (infrared radiation, microwaves and so on), these wired technologies and/or wireless technologies are included in the definition of communication media.

The terms "system" and "network" as used herein are used interchangeably.

The terms "Base Station (BS)", "radio base station", "eNB", "gNB", "cell", "sector", "cell group", "carrier" and "component carrier" herein are used interchangeably. A base station is sometimes referred to by a fixed station, a NodeB, an eNodeB (eNB), an access point, a transmission point, a reception point, a femto cell, a small cell, and the like.

A base station can accommodate one or more (e.g., three) cells (also referred to as sectors). When the base station accommodates a plurality of cells, an entire coverage region of the base station may be divided into a plurality of smaller regions, and each smaller region may also provide communication services through a base station subsystem (for example, a small indoor base station (a Remote Radio Head (RFH))). The term "cell" or "sector" refers to a part or the entirety of the coverage region of a base station and/or a base station subsystem that performs communication services in the coverage.

The terms "Mobile Station (MS)", "user terminal", "user equipment (UE)" and "terminal" herein are used interchangeably. A base station is sometimes referred to by a fixed station, a NodeB, an eNodeB (eNB), an access point, a transmission point, a reception point, a femto cell, a small cell, and the like.

A mobile station is also sometimes used by those skilled in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terms.

In addition, the radio base station herein may also be replaced with a user terminal. For example, respective modes/embodiments of the present disclosure may be applied to a structure in which communication between a radio base station and a user terminal is replaced with Device-to-Device (D2D) communication between a plurality of user terminals. At this time, a function of the above-described radio base station 10 may be regarded as a function of a user terminal 20. In addition, words such as "uplink" and "downlink" may also be replaced with "side". For example, an uplink channel may also be replaced with a side channel.

Similarly, a user terminal herein may also be replaced with a radio base station. At this time, a function of the above-described user terminal 20 may be regarded as a function of the radio base station 10.

In this specification, it is assumed that a specific action performed by a base station is also performed by an upper node (upper node) thereof according to situations. Obviously, in a network composed of one or more network nodes having a base station, various actions performed for communication with the terminal may be performed by the base station, one or more network nodes other than the base station (for example, a Mobility Management Entity (MME), a Serving-Gateway (S-GW), etc., may be considered, but not limited thereto), or a combination thereof.

The respective aspects/embodiments illustrated in this specification may be used individually or in combinations, which may also be switched and used during execution. The order of processes, sequences, flowcharts and so on of the respective aspects/embodiments described in the present specification may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to systems that use the Long Term Evolution (LTE), the LTE-Advanced (LTE-A), the LTE-Beyond (LTE-B), the super $3^{rd}$ generation mobile communication system (SUPER 3G), the IMT-Advanced, the 4th generation mobile communication system (4G), the 5th generation mobile communication system (5G), the Future Radio Access (FRA), the new Radio Access Technology (New-RAT), the New Radio (NR), the New radio access (NX), the Future generation radio access (FX), the Global System for Mobile communications (GSM (registered trademark)), the Code Division Multiple Access (CDMA 2000), the Ultra Mobile Broadband (UMB), the IEEE 802.11 (Wi-Fi (registered trademark)), the IEEE 802.16 (WiMAX (registered trademark)), the IEEE 802.20, the Ultra-WideBand (UWB), the Bluetooth (registered trademark) and other adequate radio communication methods, and/or next-generation systems that are enhanced based on these.

The phrase "based on" as used in this specification does not mean "based only on", unless otherwise specified. In other words, the phrase "based on" means both "based only on" and "based at least on."

Any reference to elements with designations such as "first", "second" and so on as used herein does not generally limit the number/quantity or order of these elements. These designations are used only for convenience, as a method of distinguishing between two or more elements. In this way, reference to the first and second elements does not imply that only two elements may be employed, or that the first element must precede the second element in some way.

The terms "judging" and "determining" as used herein may encompass a wide variety of actions. For example, "judging" and "determining" may be interpreted to mean making judgements and determinations related to calculating, computing, processing, deriving, investigating, looking up (for example, searching a table, a database or some other data structure), ascertaining and so on. Furthermore, "judging" and "determining" may be interpreted to mean making judgements and determinations related to receiving (for example, receiving information), transmitting (for example, transmitting information), inputting, outputting, accessing (for example, accessing data in a memory) and so on. In addition, "judging" and "determining" as used herein may be interpreted to mean making judgements and determinations related to resolving, selecting, choosing, establishing, comparing and so on. In other words, "judging" and "determining" may be interpreted to mean making judgements and determinations related to some action.

As used herein, the terms "connected" and "coupled", or any variation of these terms, mean all direct or indirect connections or coupling between two or more elements, and may include the presence of one or more intermediate elements between two elements that are "connected" or "coupled" to each other. The coupling or connection between the elements may be physical, logical or a combination of these. For example, "connection" may be interpreted as "access." As used herein, two elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in radio frequency fields, microwave regions and optical (both visible and invisible) regions.

When terms such as "including", "comprising" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present disclosure has been described in detail above, it should be obvious to a person skilled in the art that the present disclosure is by no means limited to the embodiments described herein. The present disclosure can be implemented with various corrections and in various modifications, without departing from the spirit and scope of the present disclosure defined by the recitations of claims. Consequently, the description herein is provided only for the purpose of explaining examples, and should by no means be construed to limit the present disclosure in any way.

The invention claimed is:

1. A user equipment, comprising:
a processor configured to monitor a first communication channel and a second communication channel,
wherein the processor is configured to, after a monitoring period of the second communication channel starts, perform the data detection according to priorities between the channels when monitoring periods of the first communication channel and the second communication channel overlap,
wherein the priorities are based on types of the channels, and
wherein the second communication channel is configured to transmit information to a group of user equipments in one transmission, and the information is acknowledge information transmitted by a base station for a reception of uplink data.

2. The user equipment according to claim 1, wherein the priority of the second communication channel is not lower than the priority of the first communication channel.

3. The user equipment according to claim 2, wherein when the first communication channel and the second communication channel are located in a same frequency band, the processor detects data of the two channels within the monitoring period of the second communication channel; and after the monitoring period of the second communication channel ends, only detects the data of the first communication channel.

4. The user equipment according to claim 2, wherein when the first communication channel and the second communication channel are located in different frequency bands and if the priority of the second communication channel is higher than the priority of the first communication channel, the processor detects data of the second communication channel in a frequency band in which the second communication channel is located within the monitoring period of the second communication channel; and after the monitoring period of the second communication channel ends, jumps to a frequency band in which the first communication channel is located to detect data of the first communication channel.

5. The user equipment according to claim 2, wherein when the first communication channel and the second communication channel are located in different frequency bands, after data of the first communication channel is moved by the base station from the first communication channel to the second communication channel, the processor simultaneously detects data of the second communication channel and the data of the first communication channel within the monitoring period of the second communication channel; and after the monitoring period of the second communication channel ends, jumps to the frequency band in which the first communication channel is located to detect the data of the first communication channel.

6. The user equipment according to claim 1, wherein the priority of the second communication channel is lower than the priority of the first communication channel.

7. The user equipment according to claim 6, wherein when the first communication channel and the second communication channel are located in a same frequency band, the processor preferentially detects data of the first communication channel; and after detection of the first communication channel ends, continues to detect the data of the second communication channel.

8. The user equipment according to claim 6, wherein when the first communication channel and the second communication channel are located in different frequency bands, the processor preferentially detects data of the first communication channel; and after detection of the first communication channel ends, jumps to a frequency band in which the second communication channel is located to detect data of the second communication channel.

9. The user equipment according to claim 1, wherein the first communication channel is a physical downlink control channel under an Internet of Things or a physical downlink shared channel under the Internet of Things, and the second communication channel is a group-based physical downlink control channel under the Internet of Things.

10. The user equipment according to claim 1, wherein the second communication channel is continuously monitored after the monitoring period starts, or the second communication channel is monitored at a predetermined time point after the monitoring period starts.

* * * * *